US011544865B1

(12) United States Patent
Kurz

(10) Patent No.: US 11,544,865 B1
(45) Date of Patent: Jan. 3, 2023

(54) POSTURE DETECTION AND CORRECTION

(71) Applicant: Apple Inc., Cupertino, CA (US)

(72) Inventor: Daniel Kurz, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/732,790

(22) Filed: Jan. 2, 2020

Related U.S. Application Data

(60) Provisional application No. 62/806,171, filed on Feb. 15, 2019.

(51) Int. Cl.
| | | |
|---|---|---|
| *G06T 7/246* | (2017.01) | |
| *G06T 7/70* | (2017.01) | |
| *A61B 5/11* | (2006.01) | |
| *G06F 3/14* | (2006.01) | |

(52) U.S. Cl.
CPC ............ *G06T 7/70* (2017.01); *G06F 3/14* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 9,746,671 | B2 | 8/2017 | Fujigaki | |
| 9,824,698 | B2 | 11/2017 | Jerauld | |
| 10,073,541 | B1* | 9/2018 | Baldwin | ............... G06F 1/1694 |
| 2011/0270135 | A1 | 11/2011 | Dooley et al. | |
| 2012/0116257 | A1* | 5/2012 | Leuthardt | ............ A61B 5/0002 |
| | | | | 600/595 |
| 2012/0268364 | A1* | 10/2012 | Minnen | ................. G06F 3/0304 |
| | | | | 345/156 |
| 2015/0309579 | A1* | 10/2015 | Wang | ................... G06K 9/6256 |
| | | | | 345/156 |
| 2017/0206691 | A1 | 7/2017 | Harrises et al. | |

(Continued)

FOREIGN PATENT DOCUMENTS

| | | |
|---|---|---|
| EP | 3422296 | 1/2019 |

OTHER PUBLICATIONS

Katzakis, Nicholas, Tong, Jonathan, Ariza, Oscar, Chen, Lihan, Klinker, Gudrun, Roder, Brigitte and Steinicke, Frank, "Stylo and Handifact: Modulating Haptic Perception through Visualizations for Posture Training in Augmented Reality", SUI' 17, Oct. 16-17, 2017, Brighton, United Kingdom, pp. 1-11.

*Primary Examiner* — Tize Ma
(74) *Attorney, Agent, or Firm* — Thompson Hine LLP

(57) ABSTRACT

Various implementations disclosed herein include devices, systems, and methods for detecting and correcting the posture of users of electronic devices. In some implementations, an image capture device or other sensor is used to estimate or otherwise determine a posture of a user. As a specific example, a head mounted device (HMD) may include a camera that captures an image of the user wearing the device and the image may be analyzed to identify 3D joint locations representing the current posture of the user relative to the HMD. The user's posture is analyzed to assess whether a posture correction or change is desirable, for example, by classifying the posture as good or bad or by scoring the posture on a numerical scale. If a posture correction or change is desirable, appropriate feedback to encourage the user to adopt the posture correction or otherwise change his or her posture is identified and provided.

21 Claims, 5 Drawing Sheets

(56) References Cited

U.S. PATENT DOCUMENTS

| | | |
|---|---|---|
| 2017/0231490 A1 | 8/2017 | Toth et al. |
| 2017/0358241 A1* | 12/2017 | Wexler ............... G06K 9/00362 |
| 2018/0249150 A1 | 8/2018 | Takeda et al. |
| 2019/0077007 A1* | 3/2019 | Mallinson ............ G05D 1/0274 |
| 2019/0139312 A1* | 5/2019 | Leppanen ............. G06F 3/0486 |

* cited by examiner

POSTURE DETECTION AND CORRECTION

CROSS-REFERENCE TO RELATED APPLICATIONS

This Application claims the benefit of U.S. Provisional Application Ser. No. 62/806,171 filed Feb. 15, 2019, which is incorporated herein in its entirety.

TECHNICAL FIELD

The present disclosure generally relates to electronic devices, and in particular, to systems, methods, and devices for detecting and correcting the posture of users of such devices.

BACKGROUND

Users of electronic devices (e.g., head mounted devices (HMDs), wearable electronic devices, desktop computers, laptops, mobile devices, and other electronic devices) sometimes experience discomfort or other negative reactions to using those devices while crouching over, remaining still for too long, or otherwise exhibiting particular postures. The phrase "posture," as used herein, refers to how the user's body or portion of the user's body is positioned relative to a reference point, such as to the electronic device itself. For example, a user who crouches down for lengthy computing sessions in front of a desktop computer may experience back, neck, or other discomfort. As another example, a user of an electronic device who remains in a steady position for a lengthy period of time may develop leg discomfort.

SUMMARY

As discussed above, users of electronic devices sometimes experience discomfort or other negative physical reactions to using those devices while sitting or standing in particular postures. Various implementations disclosed herein include devices, systems, and methods for detecting and correcting the posture of electronic device users. In some implementations, an image capture device or other sensor is used to estimate or otherwise determine a posture of a user. As a specific example, a head mounted device (HMD) may include a camera that captures an image of the user wearing the device and the image may be analyzed to identify 3D joint locations representing the current posture of the user relative to the HMD. The user's posture is analyzed to assess whether a posture correction or change is desirable. For example, this may involve classifying the posture as good or bad, scoring the posture on a numerical scale, or classifying the posture as a particular type of postures that require correction, e.g., back slouching, core leaning left, core leaning right, head turned left relative to shoulders, head turned right relative to shoulders, etc. If a posture correction or change is desirable, appropriate feedback to encourage the user to adopt the posture correction or otherwise change his or her posture is identified and provided to the user. The feedback to the user may be visual, audible, tactile, etc., or a combination of different types of feedback. The feedback may be explicit. For example, a message directly instructing a slouching user to "sit up straight" may be displayed on the device. The feedback may be more implicit. For example, the user interface on the device may display content in a way that encourages the user to correct/change his or her posture, e.g., displaying content to the right in an HMD to require the user to rotate his or her head or body to the right to view the content.

In some implementations, a user's posture condition (e.g., good/bad, slouching, leaning, 1 on a 10 point scale, etc.) is determined based on an image of the user from an image capture device on the HMD and feedback is provided at the HMD to motivate the user to move to improve his or her posture. Some such implementations involve operations performed by an electronic device having a processor. The device determines a posture of a user wearing an HMD. The HMD may be the same device or a different device than the device that performed the posture determination. The device determines the posture based on an image of the user captured by an image capture device. The posture may provide a 3D pose or other information identifying positioning of some or all of the user's body. For example, the posture may include 3D joint locations of estimated joint locations of the user relative to the HMD. The posture can be determined using machine learning or geometric optimization based on computer vision. The posture can be based additionally or alternatively on information from other devices (e.g., watches, hand-held-controllers, etc.). The posture can be based on an understanding of spatial properties of the physical environment. For example, the posture can be determined based on information that identifies or estimates the height of the user's head above the floor, whether user is sitting or standing, etc.

The device determines a posture condition based on the posture. In some implementations, the device determines whether the posture is good or bad. In some implementations, the device provides a numerical score on a continuum that quantifies the posture with respect to one or more desirability criteria. Posture can also be a function of time. Thus, determining the posture condition can be based on how the posture changes or does not change over time. For example, the posture condition may be that the user's legs have been relatively constant (e.g., not moving) for a threshold amount of time, e.g., over the last 30 minutes. Determining the posture condition may use a machine learning model such as a classification neural network, a support vector machine (SVM) or any other machine learning algorithm or regression task that gives a score. Training a machine learning model to assess posture condition can involve using posture inputs that are annotated (e.g., by qualified medical doctors or other such professionals) as good or bad, scored, or associated with corrective actions.

The device provides feedback on the HMD based on the posture condition. The feedback encourages the user to change his or her posture. As discussed above, such feedback can be explicit, e.g., providing a message that says "sit up straight" or implicit, e.g., moving a user interface elements to a different location to encourage the user to move or adding a virtual barrier requiring the user to move to look over or around the barrier to continue viewing some or all of the content, displaying a flying/buzzing bee in the user's periphery to encourage the user to look around to remove the bee, playing a sound at a particular location using spatialized sound to encourage the user to turn, etc.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
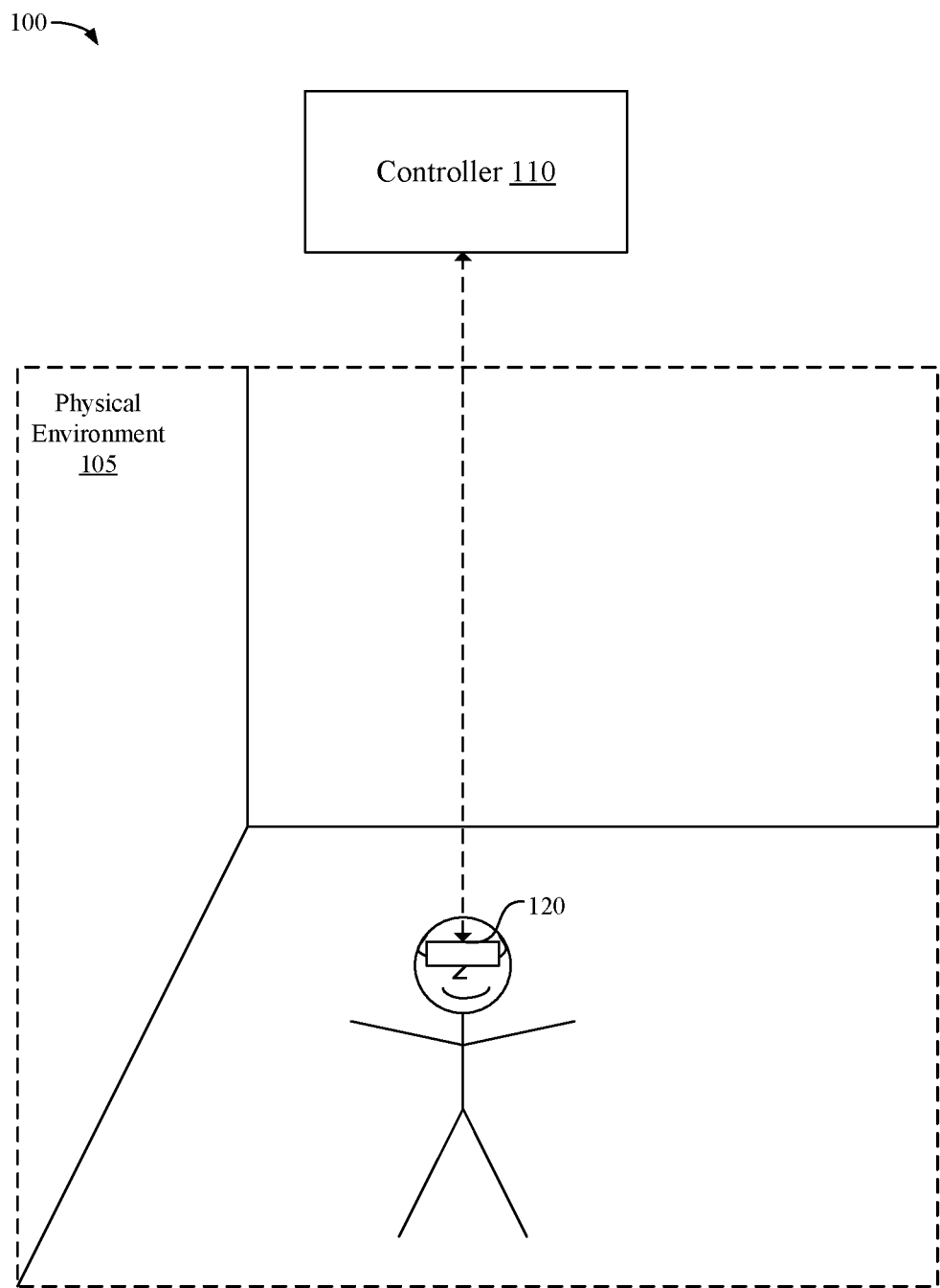
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
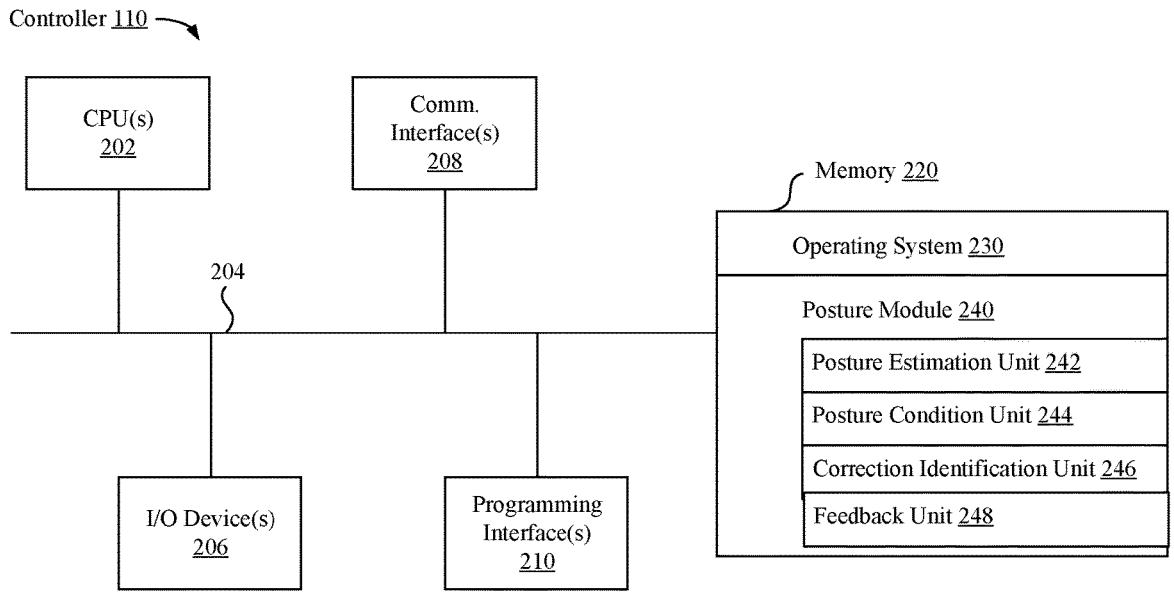
FIG. 2 is a block diagram of an example controller in accordance with some implementations.
Figure 3:
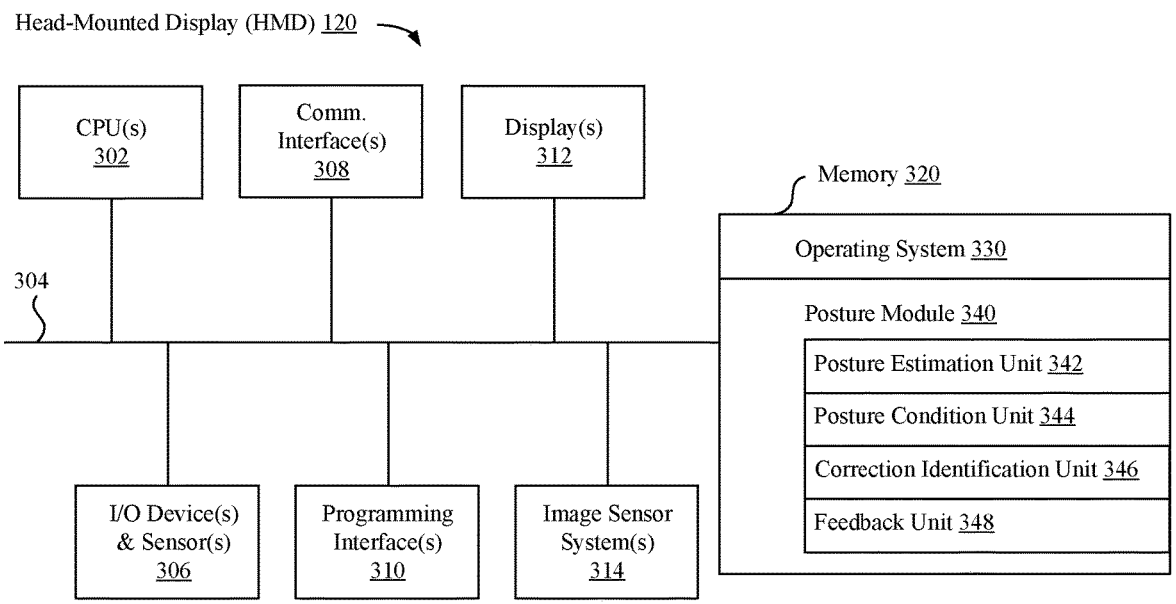
FIG. 3 is a block diagram of an example head-mounted device (HMD) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a head mounted device (HMD), other implementations do not necessarily involve an HMD and may involve other types of devices including, but not limited to, watches and other wearable electronic devices, mobile devices, laptops, desktops, gaming devices, home automation devices, and other devices that have image capture devices or sensors configures to capture information useful in determining or estimating a posture of a user.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120, one or both of which may be in a physical environment. A physical environment refers to a world that individuals can sense or with which individuals can interact without assistance of electronic systems. Physical environments (e.g., a physical forest) include physical objects (e.g., physical trees, physical structures, and physical animals). Individuals can directly interact with or sense the physical environment, such as through touch, sight, smell, hearing, and taste.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the CGR experience to the user. In some implementations, the HMD 120 includes a suitable combination of software, firmware, or hardware. The HMD 120 is described in greater detail below with respect to FIG. 3. In some implementations, the functionalities of the controller 110 are provided by or combined with the HMD 120, for example, in the case of an HMD that functions as a stand-alone unit.

According to some implementations, the HMD 120 presents a computer-generated reality (CGR) experience to the user while the user is present within the physical environment 105. In contrast to the physical environment, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses.

A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a posture module 240.

The operating system 230 includes procedures for handling various basic system services and for performing hardware dependent tasks.

In some implementations, the posture module 240 is configured to detect posture conditions and provide feedback to encourage a user to change his or her posture accordingly.

The posture estimation unit 242 includes hardware, software, or a combination of hardware and software configured to capture or assess one or more images of a user or to otherwise assess sensor data about a user to estimate the user's posture. The posture estimation unit 242 may capture or receive one or more images or other data (e.g., from HMD 120) about the user or the physical environment. The posture estimation unit 242 may execute instructions, e.g., via a processor, to perform an inference process of a machine learning process, geometric optimization, or other analysis using the images or other data, and produce data indicative of the posture of the user. The posture may be determined using an algorithm or process that accounts for information from other devices (e.g., a watch, the controller 110 itself, a separate hand-held controller or gamepad, etc.). The posture may be determined using an algorithm or process that accounts for spatial properties of the physical environment (the height of the user's head above the floor, whether the user is sitting or standing, etc.).

The posture condition unit 244 is configured to estimate the posture condition of a posture by executing, for example using a processor, instructions to perform an inference process of a machine learning process or other criteria-based assessment of the posture. The posture condition unit 244 may include instructions that when executed determine whether the current posture is good or bad, give the current posture a numerical score, or otherwise produce an assessment of the posture. The posture condition may be determined using a machine learning model such as a classification neural network, a support vector machine (SVM) or any other machine learning algorithm or regression task.

The correction identification unit 246 is configured to provide a correction for a posture. The correction may be generic, e.g., identifying that the user is slouching and should sit up straighter, or more specific, e.g., identifying a corrected posture including particular joint locations that the user would have if the user were to sit up straighter. The correction identification unit 246 may include instructions that when executed determine a correction for a given posture. The correction may be identified using a stored dataset of posture conditions and associated corrections, an algorithm configured to determine improved posture (e.g., straighter spine, etc.), a machine learning model such as a neural network trained to determine a correction, or any other computer-implemented correction identification technique.

The feedback unit 248 includes hardware, software, or a combination of hardware and software configured to provide feedback to a user to require or otherwise encourage a user to correct or otherwise change his or her posture. The feedback unit 248 may include instructions that, when executed, determine an appropriate feedback for a given correction identification. The feedback may be identified using a stored dataset of corrections to associated feedback, an algorithm configured to determine a feedback (e.g., determine to display a bee to the user's left based on the user looking too much to the right side, etc.), a machine learning model such as a neural network trained to determine a feedback or any other computer-implemented feedback determination technique.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the HMD 120 includes a single display. In another example, the HMD 120 includes a display for each eye of the user.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a posture module 340.

The operating system 330 includes procedures for handling various basic system services and for performing hardware dependent tasks.

In some implementations, the posture module 340 is configured to detect posture conditions and provide feedback to encourage a user to change his or her posture accordingly.

The posture estimation unit 342 includes hardware, software, or a combination of hardware and software configured to capture or assess one or more images of a user or sensor data about a user to estimate the user's posture. The posture estimation unit 342 may capture or receive one or more images or other data (e.g., from controller 110, a watch, the HMD 120 itself, a separate hand-held controller or gamepad, etc.) about the user or the physical environment. The posture estimation unit 342 may execute instructions, e.g., via a processor, to perform an inference process of a machine learning process, geometric optimization, or other analysis using the images or other data, and produce data indicative of the posture of the user. The posture may be determined using an algorithm or process that accounts for spatial properties of the physical environment (the height of the user's head above the floor, whether the user is sitting or standing, etc.).

The posture condition unit 344 is configured to estimate the posture condition of a posture by executing, for example using a processor, instructions to perform an inference process of a machine learning process or other criteria-based assessment of the posture. The posture condition unit 344 may include instructions that when executed determine whether the current posture is good or bad, give the current posture a numerical score, or otherwise produce an assessment of the posture. The posture condition may be determined using a machine learning model such as a classification neural network, a support vector machine (SVM) or any other machine learning algorithm or regression task.

The correction identification unit 346 is configured to provide a correction for a posture. The correction may be generic, e.g., identifying that the user is slouching and should sit up straighter, or more specific, e.g., identifying a corrected posture including particular joint locations that the user would have if the user were to sit up straighter. The correction identification unit 346 may include instructions that when executed determine a correction for a given posture. The correction may be identified using a stored dataset of posture conditions and associated corrections, an algorithm configured to determine improved posture (e.g., straighter spine, etc.), a machine learning model such as a neural network trained to determine a correction, or any other computer-implemented correction identification technique.

The feedback unit 348 includes hardware, software, or a combination of hardware and software configured to provide feedback to a user to require or otherwise encourage a user to correct or otherwise change his or her posture. The feedback unit 348 may include instructions that when executed determine an appropriate feedback for a given correction identification. The feedback may be identified using a stored dataset of corrections to associated feedback, an algorithm configured to determine a feedback (e.g., determine to display a bee to the user's left side based on the user looking too much to the right side, etc.), a machine learning model such as a neural network trained to determine a feedback or any other computer-implemented feedback determination technique.

Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
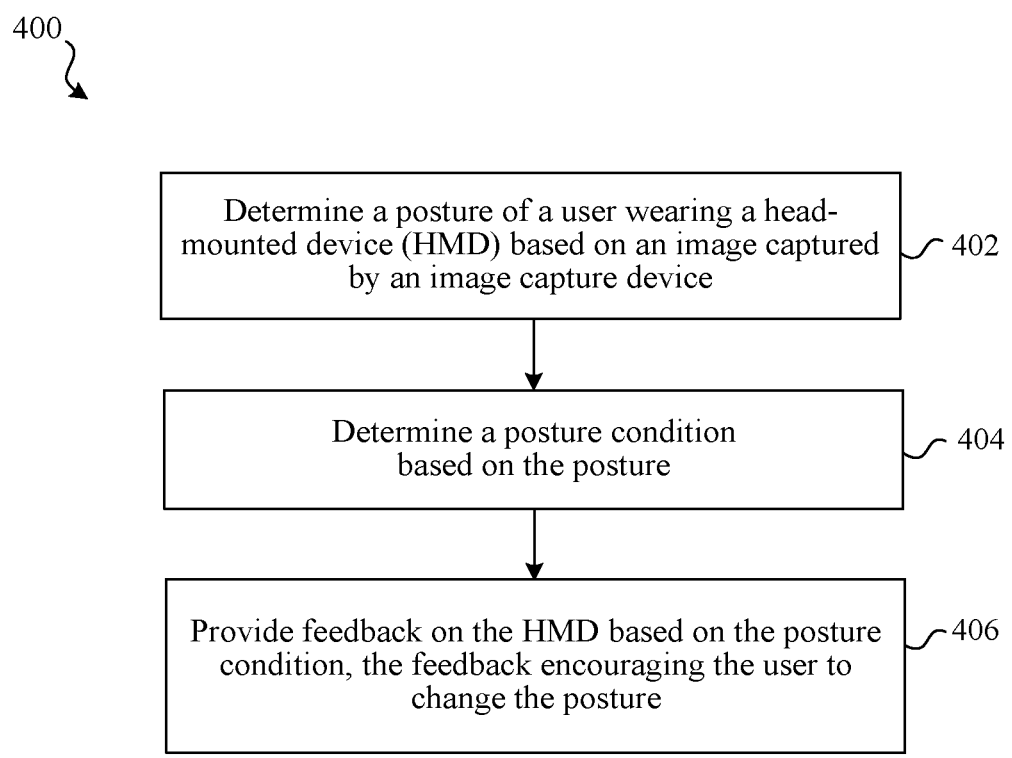
FIG. 4 is a flowchart illustrating an exemplary method of detecting and correcting the posture of electronic device users, according to some implementations.

FIG. 4 is a flowchart illustrating an exemplary method of detecting and correcting the posture of an electronic device user. In some implementations, the method 400 is performed by a device (e.g., controller 100 or HMD 120 of FIGS. 1-3). The method 400 can be performed at a mobile device, head mounted device (HMD), desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 determines a posture of a user wearing an HMD based on an image captured by an image capture device. The HMD may be the same device or a different device than the device that performs the determining of the posture. In one example, the image is captured by HMD 120 and provided to controller 110 where the posture is determined. In another example, the image is captured by the HMD and the HMD itself determined the posture. The posture may provide a 3D pose or other information identifying positioning of some or all of the user's body. For example, the posture may include 3D locations of joints of the user relative to the HMD. The posture can be determined using machine learning or geometric optimization based on computer vision or any combination thereof.

The posture can be based additionally or alternatively on information from other devices (e.g., watches, hand-held-controllers, etc.). For example, a watch on the user's wrist can provide information about the position and movement of the user's arm, hand, or other body parts. Such information can be based on an image capture device or another sensor on the watch or based on an accelerometer or movement tracking device tracking the position and movement of the watch, for example, relative to the HMD. In another example, one or more devices that are separate from the user in the physical environment capture images or other sensor-based data regarding the user. For example, a user wearing an HMD may be interacting with a laptop and images of the user from the laptop may be provided to the HMD. In another example, the HMD may receive images of the user from one or more security cameras or other sensors that are mounted on walls around the user.

The posture can be based on an understanding of spatial properties of the physical environment. For example, the posture can be determined based on information that identifies or estimates the height of the user's head above the floor, whether user is sitting or standing, etc. In some implementations, a 3D mapping of the physical environment around the user is generated based on information from an HMD or other devices in the physical environment. Such a mapping, for example, may be generated based on information from an RGB-D camera or generated using a simultaneous localization and mapping (SLAM) technique that utilizes one or more images of the physical environment captured by an image capture device on the HMD or elsewhere in the physical environment. The relative 3D position of the HMD and other devices can be tracked based on data from an accelerometer, a gyroscope, a barometer, a compass, a positioning system, or any other device used for location and movement tracking. An understanding of the spatial properties of the physical environment can also be used to ensure that the system does not encourage the user to change the posture in an inappropriate way, e.g., ensuring the user doesn't turn and contact an adjacent wall or stand up in a room having a very low ceiling, etc.

At block 404, the method 400 determines a posture condition based on the posture. In some implementations, the posture condition classifies the posture as either good or bad. In some implementations, the posture condition provides a numerical score on a continuum that quantifies the posture with respect to one or more desirability criteria. Posture can also be a function of time. Thus, determining the posture condition can be based on how the posture changes or does not change over time. Determining the posture condition can involve determining a change or lack of change in the posture over time, e.g., determining that the user has not moved a body part in a threshold amount of time. For example, the posture condition may be that the user's legs have been relatively constant (e.g., not moving) over a threshold amount of time, e.g., over the last 30 minutes. Determining the posture condition may use a machine learning model such as a classification neural network, a support vector machine (SVM) or any other machine learning algorithm or regression task that gives a score. Training a machine learning model to assess posture condition can involve using posture inputs annotated (e.g., by qualified medical doctors or other such professionals) as good or bad, scored, or associated with corrective actions.

In an alternative implementation, the posture condition is determined directly from an image of the user without explicitly determining the posture of the user. For example, such a technique may receive an image of a user wearing an HMD that was captured by an image capture device on the HMD and directly determine a posture condition based on the image. The posture condition may be determined, for example, by interpreting the image using a classification neural network or assessing the image using a support vector machine (SVM) or regression analysis.

At block 406, the method 400 provides feedback on the HMD based on the posture condition. The feedback encourages the user to change his or her posture. Such feedback can be explicit, e.g., providing a message that says "move your legs" or "stand up now," or implicit, e.g., moving a user interface element to a different location to encourage the user to move, adding a virtual barrier requiring the user to move to look over or around it to continue viewing some or all of the content, displaying a flying/buzzing bee in the user's periphery to encourage the user to look around to remove the bee, or playing a sound at a particular location using spatialized sound to encourage the user to turn, etc.

The method 400 may involve determining a correction that includes an improved posture, e.g., positions of joints in a posture in which the user is sitting up straight rather than slouching. In some implementations, a machine learning model is trained to predict an appropriate correction for a given posture using examples of "good" and "bad" posture. Examples used for training may be manually labelled, for example, by a qualified health professional. In some implementations, motion tracking of human subjects exhibiting good and bad posture is used to create data sets of posture data for use in training machine learning models used to assess posture condition or determine posture corrections.

The feedback may be determined based on the posture, the posture condition, an improved posture, a correction, or other appropriate information. For example, determining the feedback may include determining differences in the current posture and the improved posture and determining a visual or audible cue that is expected to result in a movement of the user such that the current posture changes to the improved posture. In one example, the current posture includes locations of shoulder joints of the user and a first height above the floor and the improved posture includes locations of the shoulder joints of the user at a second height that is higher above the floor than the first height. The difference can be identified and visual input provided that is associated with causing the user to straighten up or otherwise raise the position of his or her shoulders. In another example, the current posture may include a pose of a head of the user that is fixed in a given direction and the correction may include one or more poses of the head of the user in other orientations. The difference can be identified and visual input provided that is associated with causing the user to move his or her head to the left or to the right, e.g., a virtual bee flying randomly to the left or right of the user in the periphery of the user's visual field of view. In one example, feedback is determined using a skeletal model. For example, the system may consider one or more potential locations to add a virtual object and select a location for the virtual object by identifying a movement of the user's eyes, hands, feet, etc. to view or interact with the object and resulting movement of the user's body according to the skeletal structure, e.g., via an inverse kinematics technique. In a data-driven implementation, user posture data is tracked over time and a machine learning model learns how various additions of virtual content result in user posture changes. These associations can then be used to optimize or otherwise select an appropriate feedback to achieve a desired correction.

In some implementations, feedback is removed after an amount of time, a user action, an improved posture, or the satisfaction of other removal criteria. In some implementations, feedback, such as virtual content that was added to encourage a posture change, is removed based on detecting that the posture of the user has changed to a second/improved posture condition (e.g., the user has turned his head as desired) or detecting that the user has interacted with the virtual content (e.g., the user looked at the virtual bee and swatted it away).

In some implementations, a correction for a posture condition is a sequence of multiple subsequent postures. In such instances, the feedback can be determined to encourage the user to move through the sequence of multiple postures. For example, the feedback may encourage the user relax his or her neck by first turning it all the way to the left, then all the way to the right, etc.

Figure 5:
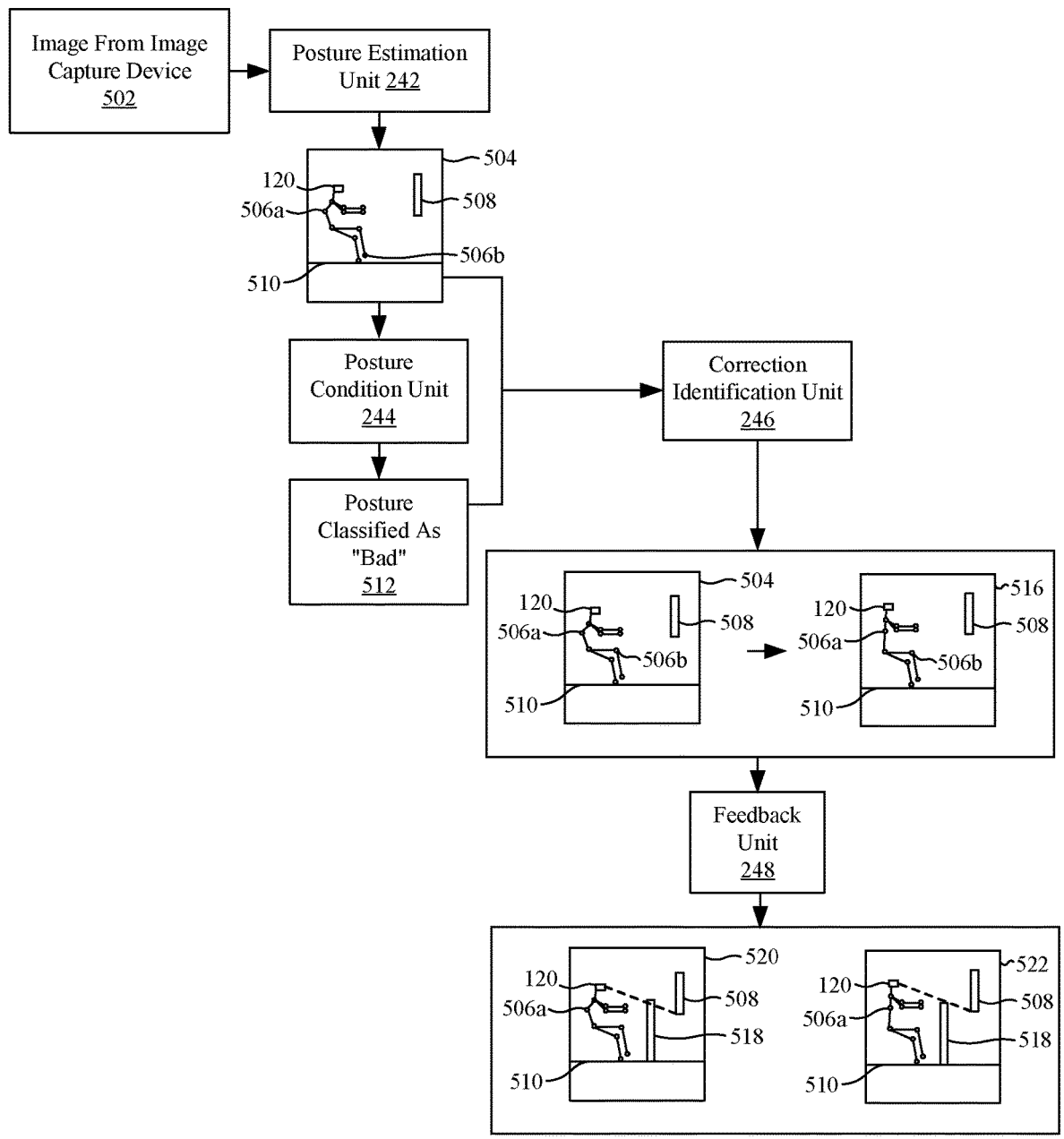
FIG. 5 is a block diagram illustrating an exemplary process of detecting a posture condition and providing feedback to correct the posture condition.

FIG. 5 is a block diagram illustrating an exemplary process of detecting a posture condition and providing feedback to correct the posture condition. In FIG. 5, one or more images from an image capture device 502 are provided to the posture estimation unit 242. The images depict the user or the physical environment including the user. In other implementations, the one or more images are provided to a different pose detection unit, such as posture estimation unit 342 on an HMD rather than on posture estimation unit 242, which may be on a separate controller.

In FIG. 5, the posture estimation unit 242 analyzes the one or more images 502 to determine a posture depicted in depiction 504. In this example, the posture is represented by a collection of joint locations, such as joint locations 506a, 506b, in a three dimensional (3D) coordinate system. In this example, the posture is determined relative to the 3D locations of the floor 510 and the HMD 120.

The posture represented in depiction 504 is input to the posture condition unit 244. The posture condition unit 244 assesses the posture, for example, using a machine learning model or geometric analysis and, in this example, produces output 512 classifying the posture as "bad."

The output 512 and the posture depicted in depiction 504 are input to the correction identification unit 246. The correction identification unit 246 determines an appropriate correction. In this example, the correction identification unit 246 identifies that the position of the joint 506a could be improved relative to other joints of the posture, e.g., so that the user would be sitting up straight rather than slouching. Accordingly, the correction identification unit 246 identifies that the user's posture would be improved by encouraging the user to change from the posture depicted in depiction 504 to the posture depicted in depiction 516.

The correction is provided to the feedback unit 248. The feedback unit 248 determines that inserting an obstacle 518 as depicted in depictions 520 and 522 would encourage the user to change his or her posture and likely improve the relative positioning of joint location 506a. Specifically, the feedback unit 248 identifies the relative locations of the HMD 120 and the monitor 508 (which may be a real monitor or a virtual monitor) and determines that inserting the obstacle 518 at the depicted location in depictions 520, 522 will require the user to raise the HMD 120 and thus likely straighten his or her back and align the joints in a more desirable way to be able to see all of the monitor 508. With a slouched back, as shown in depiction 520, the user is unable to see all of the monitor 508. However, if the user lifts his or her head and thus straightens up, the user will be able to see all of the monitor 508, as shown in depiction 522.

Figure 6:
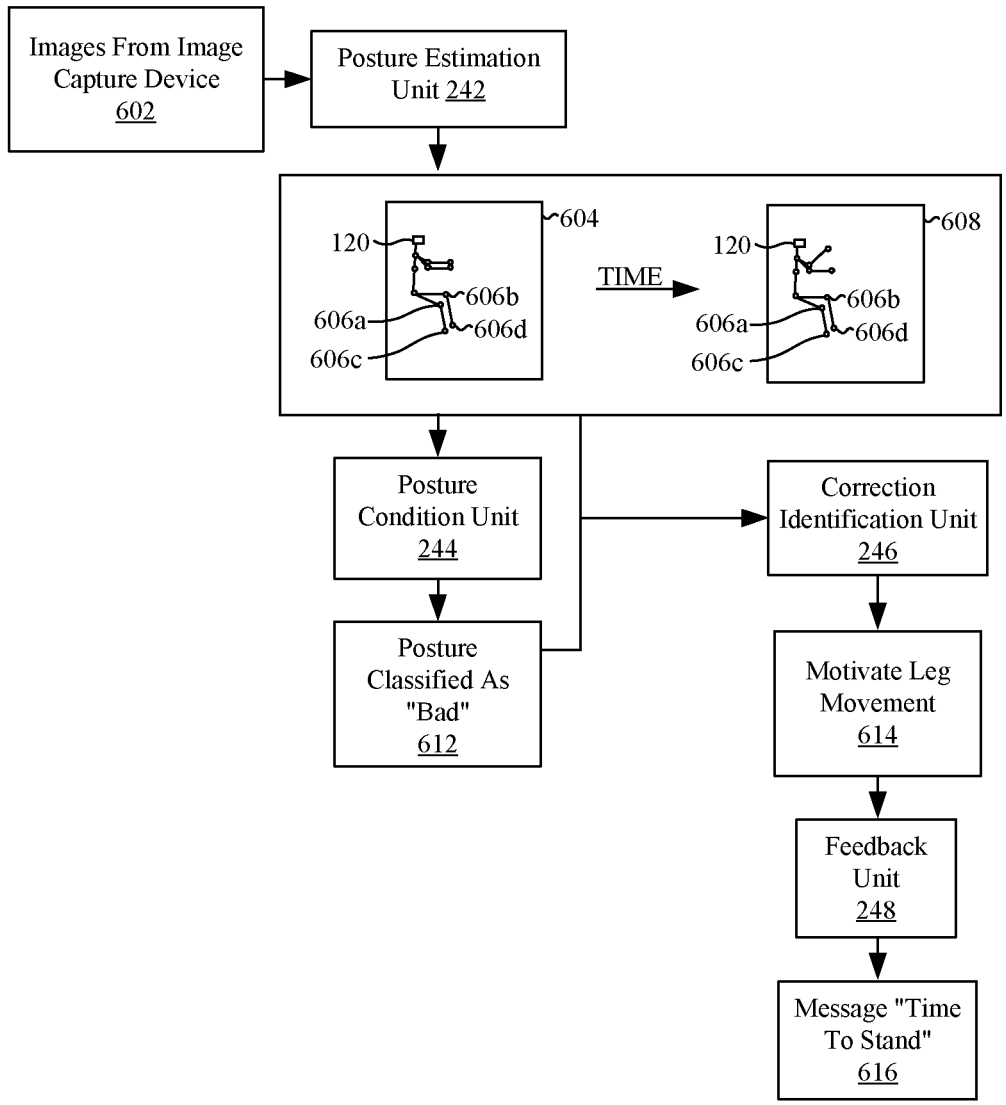
FIG. 6 is a block diagram illustrating another exemplary process of detecting a posture condition and providing feedback to correct the posture condition.

FIG. 6 is a block diagram illustrating another exemplary process of detecting a posture condition and providing feedback to correct the posture condition. In FIG. 6, one or more images from an image capture device 602 are provided to the posture estimation unit 242. The images depict the user or the physical environment including the user. In other implementations, the one or more images are provided to a different pose detection unit, such as posture estimation unit 342 on an HMD rather than on posture estimation unit 242, which may be on a separate controller.

In FIG. 6, the posture estimation unit 242 analyzes the one or more images 602 to determine a posture depicted in depictions 604, 608. In this example, the posture is represented in depictions 604, 608 by a set of joint locations at two different instances in time, such as the joints locations 606a, 606b, 606c, 606d at a point first point in time as depicted in depiction 604 and a later point in time as depicted in depiction 608. In this example, the posture is determined relative to the 3D location of the HMD 120. In other examples, posture over a period of time may include positions (e.g., joint locations) at more than two instances of time, e.g., joint locations every 15 seconds, every 30 seconds, or every minute over the course of 10 minutes, a half hour, an hour, etc.

The posture represented in the depictions 604, 608 is input to the posture condition unit 244. The posture condition unit 244 assesses the posture, for example, using a machine learning model or geometric analysis and, in this example, produces output 612 classifying the posture as "bad."

The output 612 and the posture depicted in the depictions 604, 608 are input to the correction identification unit 246.

The correction identification unit 246 determines an appropriate correction. In this example, the correction identification unit 246 identifies that the posture could be improved by encouraging movement. In this example, the user's legs have remained relatively constant for the period of time of the depictions 604, 608. Accordingly, the correction identification unit 246 identifies that the user's posture would be improved by motivating leg movement and thus produces output indicating correction 614 to motivate leg movement.

The correction 614 is provided to the feedback unit 248. The feedback unit 248 determines that providing an explicit message to motivate leg movement, e.g., displaying output message 616 "time to stand" on the device to the user will likely cause the user to move his or her legs.

The type of output produced by the feedback unit 248 may depend upon the nature of the posture. For example, if the posture is "bad" because the user hasn't moved his legs in 30 minutes, the output may be implicit, e.g., displaying a virtual item that may motivate the user to stand. If the posture is "bad" because the user hasn't moved his legs in 2 hours, the output may be explicit, e.g., displaying a message requesting that the user stand up. If the posture is "bad" because the user hasn't moved his legs in 5 hours, the output may be even more restrictive, for example, requiring that the user address the bad posture before some or all of the user experience or its content will be available to the user. Thus, different threshold conditions or criteria may be associated with different output types. In some implementations, posture is monitored, for example, based on additional images of the user, and the user experience or its content is blocked or withheld from the user until corrected posture is confirmed using the additional images. In some implementations, feedback escalates as "bad" posture continues over time, e.g., escalating from implicit feedback, to explicit feedback, to content denial, etc.

In some implementations, sensitivity of the posture condition detection (e.g., thresholds for what is considered bad), the type or level of correction, or the type or level of feedback depend upon the user's height, weight, history, medical conditions, preferences, or other attributes. For example, as a user improves his average sitting posture over weeks, months, or years, the thresholds for "sitting up straight" may increase so that the user continues to improve his or her sitting posture. The machine learning models or other algorithms used for assessing posture, posture condition, correction, or feedback can account for user attributes, e.g., as inputs to neural network models, etc. The assessment of assessing posture, posture condition, correction, or feedback can similarly take into account context. For example, the posture condition assessment may account for whether a user is working at a work station or laying on his or her sofa playing a game.

Some implementations disclosed herein utilize head-mounted devices (HMDs) to detect and correct the posture of electronic device users. Other implementations use other types of electronic device including, but not limited to, other wearable electronic devices, desktop computers, laptops, mobile devices, and other numerous other electronic devices.

In some implementations, a mobile phone or tablet is used to detect and correct the posture of a user. Such implementations may involve tracking the phone or tablet (e.g., relative to a world coordinate system), tracking the user relative to the device, using this information to assess posture (e.g., good or bad), and providing feedback. The feedback may (or may not) be limited in comparison to the feedback that may be provided in HMD implementations.

The feedback may involve feedback providing via an augmented reality (AR) application and, for example, involve positioning or otherwise using virtual content to encourage the user to make posture adjustments. In other types of applications (e.g., classical 2D applications), the feedback may involve providing a simple notification. In one example, an interface is provided similar to a face enrollment interface in which the interface asks or encourages the user to rotate or move his or her head or other body part, e.g., to change the appearance of a ring or other graphical indicator.

In some implementations a desktop or other stationary computing device is used to detect and correct the posture of a user. In some implementations, a method assumes that the computing device is static and uses a sensor to track the user. For example, a user facing camera may be used to track the user. Posture detection, for example, may be performed using a front-facing camera. The feedback may be a simple notification or any other appropriate feedback. In some examples, while watching a movie and little user movement is detected, the method may provide a popup notification or place content "behind" some virtual object or plane and use parallax to force the user to move side to side to see around the object to the content that he or she was watching. The sensor (e.g., a front-facing camera) may be used to determine where the user is relative to the display to provide this effect.

In some implementations, a computing device that is providing a video conferencing or video call experience is used to detect and correct the posture of a user. For example, during a video call, a preview of the user may be displayed for the user. A method may determine that the user's posture would improve if the user where to lift his or her head higher. To do so, the method may modify the user interface to encourage the action. For example, if the method wants to encourage the user to lift his head higher, the method may slowly crop portions of a self preview to make it appear as if the user is lower and lower in the preview window. This may encourage the user to lift his or her head higher to keep it centered within the preview window. The view of the other person on the video call will not see the cropping effect, e.g., he or she would see the normal capture of the front-facing camera.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
at an electronic device having a processor:
determining a posture of a user using an electronic device based on an image of the user captured by an image capture device on the electronic device;
determining a posture condition based on the posture;
providing a view of three dimensional (3D) environment comprising a barrier and visual content on the electronic device, wherein the barrier is positioned to block at least a portion of the visual content in the view based on a viewpoint of the user in the 3D environment, wherein positioning of the barrier encourages the user to correct the posture condition by changing the posture to change the viewpoint in order to continue viewing the visual content;
changing the viewpoint based on the user changing the posture; and
providing an updated view of the 3D environment, wherein the at least a portion of the visual content that was blocked by the barrier is visible in the updated view based on the changed viewpoint.

2. The method of claim 1, wherein the electronic device is a head-mounted device (HMD) worn by the user.

3. The method of claim 1 further comprising determining a correction comprising an improved posture, wherein the visual or audio content is determined based on the correction.

4. The method of claim 1, wherein providing the visual or audio content comprises providing a message identifying a particular movement.

5. The method of claim 1, wherein directing attention to the virtual content requires that the user change the posture.

6. The method of claim 1, wherein providing the visual or audio content comprises providing virtual content at a location that obstructs a view of other content to encourage the user to change the posture in order to look over or around a barrier to continue viewing the other content, wherein a desired change in posture will provide an unobstructed view of the other content.

7. The method of claim 1, wherein providing the visual or audio content comprises providing virtual content comprising spatialized audio content provided at a location in a periphery of the user's visual field of view to encourage the user to turn based on the location of spatialized audio content.

8. The method of claim 1, wherein providing the visual or audio content comprises providing virtual content, wherein the virtual content is removed based on detecting that the posture of the user has changed to a second posture or detecting that the user has interacted with the virtual content.

9. The method of claim 1 further comprising determining to encourage the user to move through a sequence of multiple postures, wherein the visual or audio content encourages the user to move through the sequence of multiple postures.

10. The method of claim 1, wherein determining the posture condition comprises classifying the posture.

11. The method of claim 1, wherein determining the posture condition comprises determining a change or lack of change in the posture over time.

12. The method of claim 1, wherein determining the posture condition comprises determining that the user has not moved a body part in a threshold amount of time.

13. The method of claim 1, wherein determining the posture comprises identifying three dimensional (3D) locations of joints of the user relative a head-mounted device (HMD).

14. The method of claim 1, wherein the posture is determined using machine learning or geometric optimization based on computer vision.

15. The method of claim 1, wherein the posture is determined using information from other devices held by or attached to the user.

16. The method of claim 1, wherein the posture is determined based on determining spatial properties of the physical environment.

17. The method of claim 1, wherein the at least a portion of the visual or audio content is moved to the different location to encourage the user to change the posture in order to continue viewing the visual content.

18. The method of claim 1, wherein the at least a portion of the visual or audio content is moved to the different location to encourage the user to change the posture in order to look over or around a barrier to continue viewing the content.

19. The method of claim 1, wherein the at least a portion of the visual or audio content is moved to the different location to encourage the user to change the posture in order to look around or turn based on a location of spatial audio content.

20. The method of claim 1 further comprising determining the position of the content to encourage posture correction by identifying the different location based on determining that moving the at least a portion of the visual or audio content to the different location will encourage the user to change the posture in order to continue viewing or hearing the visual or audio content.

21. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
determining a posture of a user using an electronic device based on an image of the user captured by an image capture device on the electronic device;
determining a posture condition based on the posture;
providing a view of three dimensional (3D) environment comprising a barrier and visual content on the electronic device, wherein the barrier is positioned to block at least a portion of the visual content in the view based on a viewpoint of the user in the 3D environment, wherein positioning of the barrier encourages the user to correct the posture condition by changing the posture to change the viewpoint in order to continue viewing the visual content;
changing the viewpoint based on the user changing the posture; and
providing an updated view of the 3D environment, wherein the at least a portion of the visual content that was blocked by the barrier is visible in the updated view based on the changed viewpoint.

* * * * *